Sept. 10, 1963   R. M. ANDERSON ET AL   3,103,121
STEP DRIVE MECHANISM AND ESCAPEMENT
Filed Nov. 4, 1958
FIG. I
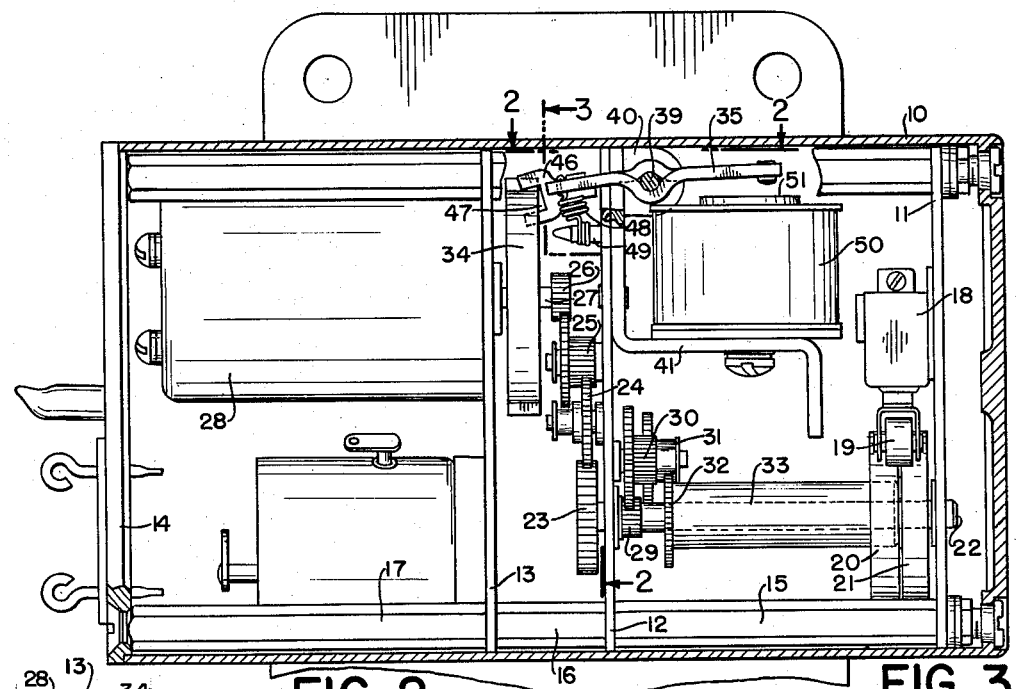
FIG. 2
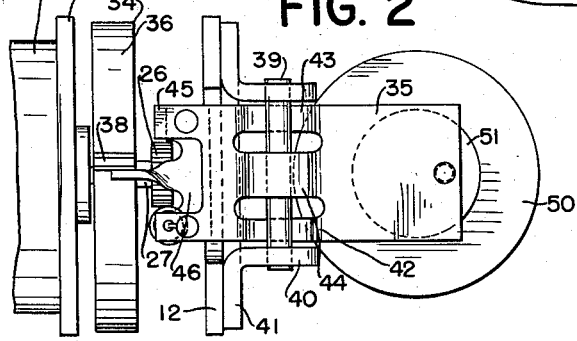
FIG. 3
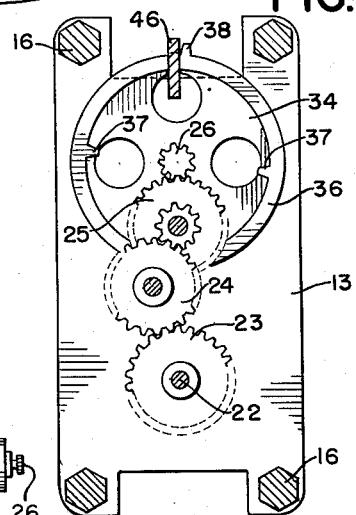
FIG. 4   FIG. 5
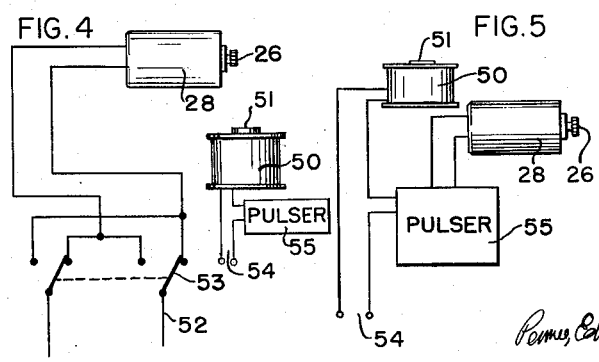
INVENTORS
REED M. ANDERSON
ANTONIO A. BUCCITTI
BY
ATTORNEYS

United States Patent Office 3,103,121
Patented Sept. 10, 1963

3,103,121
STEP DRIVE MECHANISM AND
ESCAPEMENT
Reed M. Anderson, Cheshire, and Antonio A. Buccitti, Waterbury, Conn., assignors to Consolidated Electronics Industries Corp., Waterbury, Conn., a Delaware corporation
Filed Nov. 4, 1958, Ser. No. 771,776
9 Claims. (Cl. 74—1.5)

The present invention relates to intermittent or step drive or actuator devices, and more particularly to a novel and improved escapement-actuated step drive and to a novel escapement mechanism which advantageously may be used in connection therewith.

Intermittent or step drive mechanisms are old in concept and usually incorporate a variety of ratchet and pawl devices for effecting the desired intermittent actuating movement. Such known arrangements, while satisfactory for limited purposes, are usually quite bulky, physically, and are disadvantageous for certain applications because of their inherent slowness of operation. Thus, in a typical ratchet type step drive, the driving force is applied through a reciprocating member, usually solenoid actuated. Since the reciprocating member must be sufficiently strong to impart the desired driving force, it necessarily has substantial mass in relation to the power output of the drive device as a whole. And, as will be readily understood, the mass of the reciprocating parts is an inherently limiting factor in the speed of reciprocation in a device of given physical size and power capabilities.

In accordance with the present invention, a novel and improved step drive device is provided in which the reciprocating member functions only as an escapement, and the power output of the drive device is derived from a non-reciprocating source, the operation of which is controlled by the escapement. The reciprocating escapement parts may be a very low mass, in relation to the power output of the device as a whole, so that the reciprocations thereof may take place at extremely high speed, permitting high speed, intermittent operation of the drive system.

Advantageously, the source of driving power is an electric motor, the rotor shaft of which is associated with the escapement mechanism. The arrangement is such that rotations of the rotor are controlled by the escapement mechanism in a manner independent of the motor energization. That is, even though the motor is energized, the rotor will not rotate until release by the escapement mechanism. At selected times, as in response to a control signal or pulse, the escape mechanism may be released to permit rotation of the motor rotor through a predetermined angle.

As one of the more specific features of the invention, the new step drive device incorporates a novel escapement mechanism, which is especially adapted for, but not necessarily restricted to, use in the new step drive system. The new escapement mechanism comprises, in general, an escape wheel carried by the rotor shaft of the motor and having abutment elements projecting alternately in opposite directions at spaced intervals about its periphery. An escape element, such as a pivoted, forked lever co-acts with the escapement wheel in such manner that the lever is adapted to engage, in alternate operative positions, alternate abutment elements on the wheel. Accordingly, when the escape element is shifted from one position to another, the wheel is permitted to rotate through a predetermined arc, until the escape element is engaged by the next successive alternate abutment element.

One of the important advantages of the improved step drive device resides in its extremely high speed of operation in relation to its power output and in comparison to step drives of known design. Another advantage of substantial importance resides in the fact that the improved step drive is reversible in its operation. Thus, by merely reversing the direction of rotation of the motor rotor, the intermittent operations of the device may be caused to take place in a reversed direction. Such reversible operation is, of course, not possible with the conventional ratchet type drives.

For a better understanding of the invention, and for further description of the above and other novel and advantageous features thereof, reference should be made to the following detailed description and to the accompanying drawing, in which:

FIG. 1 is a longitudinal, cross-sectional view of a step drive device incorporating the features of the invention;

FIG. 2 is an enlarged fragmentary cross-sectional view taken generally along line 2—2 of FIG 1;

FIG. 3 is a cross-sectional view taken generally along line 3—3 of FIG. 1;

FIG. 4 is a simplified, schematic representation of typical control circuitry for use in connection with the operation of the device of FIG. 1; and FIG. 5 is a simplified, schematic representation of an alternate control circuit for use in connection with the operation of the device of FIG. 1.

Referring now to the drawing, there is illustrated a complete step drive mechanism as typically employed for effecting the actuation of a switch, for example, upon the sensing by the mechanism of a predetermined number of control signals or pulses. The illustrated device comprises a housing 10, in which is received a suitable frame structure comprising deck plates 11—14 connected by posts 15—17. Mounted on the deck plate 11 is a switch 18 of conventional design having an actuating linkage including a follower wheel 19. The follower wheel rides on a pair of cams 20—21 positioned in side-by-side relation and having notches (not shown) therein for receiving the follower wheel 19. One of the cams rotates very slowly in relation to the other cam and normally the follower wheel 19 is held in one position by one or both of the cams. During each revolution of the high speed cam which, in the illustrated apparatus, is the cam 21, the notched portion of the cam passes underneath the follower wheel 19. The wheel is prevented from entering the notch by the second cam 20 but, upon continued rotation of the cams 20—21, the notch of the slow speed cam 20 will eventually move into position to receive the follower 19. Thereupon, during the next rotation of the high speed cam 21, the notch thereof moves into alignment with the follower 19, along with the notch of the slow speed cam 20, permitting the follower to drop into the aligned notches and effect the desired actuation of the switch 18.

In the illustrated arrangement, the high speed cam 21 is carried by a shaft 22 journaled in the deck plates 11—12 and mounting a gear 23 at its opposite end. The gear 23 is driven through an idler gear 24 and speed reduction gear 25 by a pinion 26 carried by the shaft 27 of the rotor of an electric motor 28. The cam shaft 22 also mounts a pinion 29 which drives, through reduction gears 30—31, a gear 32 mounted at the end of a sleeve 33. The sleeve 33, in turn, carries the slow speed cam 20. In the illustrated drive arrangement, which is merely typical and does not form part of the present invention, rotation of the main drive pinion 26 effects simultaneous rotation of the cams 20—21, with the cam 20 rotating in fixed relation to the cam 21, but at a substantially lower speed.

The motor 28 may, in itself, be of conventional design, and is advantageously a small, low inertia D.C. motor having, by way of example, a rating of 20 to 30 volts D.C. with ¼ amp. current rating.

In accordance with the invention, the motor 28 is adapted to be energized for rotation in one direction or the other, but is permitted to rotate only under the control of an escapement mechanism, to be described. Thus, although the driving power supplied for operating the cams 20—21 is derived directly from the motor 28, the application of such power is wholly under the control of an escape mechanism, which permits or prevents rotation of the motor rotor in accordance with control signals or pulses.

As one of the specific aspects of the invention, the escapement mechanism comprises an escape wheel 34 fixed to the rotor shaft 27 for rotation therewith and an escape lever 35 which co-acts with the wheel 34 to permit controlled rotation thereof. Advantageously, the escape wheel 34 is provided about its outer periphery with a flange 36 of circular form which projects axially forward from the base or web of the wheel. At circumferentially spaced intervals which, in the illustrated apparatus, represent arcs of 180°, the flange 36 is provided with abutment elements or teeth 37 which project radially inward from the flange. Between the inwardly projecting abutment elements 37 are similar, but outwardly projecting elements 38, likewise spaced 180° apart. In this connection, while the escape wheel of the illustrated device is provided with a total of four abutment elements, it will be understood that a different number of elements may be employed, it being contemplated, however, that alternate elements will project in opposite directions.

As shown best in FIGS. 1 and 2, the escape lever 35 is mounted by a pin 39 for pivoting movement about an axis extending at right angles to the axis of the rotor shaft 27. The pivot pin 39 may be mounted at its ends in arms 40 of a metal bracket 41 carried by the deck plate 12.

In the illustrated device, the escape lever 35 comprises a flat, stamped body portion 42 having oppositely formed portions 43—44 for engaging the pivot pin 39 and having a generally U-shaped end upon which is mounted a forked end section 46. Spaced arms of the end section 46, defining between them a recess 47, are positioned in straddling relation to the circular flange 36 of the escape wheel 34, substantially as shown in FIG. 1. The width of the recess 47, measured in a direction radially of the rotor axis, is greater than the combined radial dimension of the flange 36 and either of the inwardly or outwardly projecting abutment elements 37—38, and, advantageously, is less than the combined radial dimension of the flange 36 plus both the abutment elements 37—38.

In accordance with the invention, the escapement lever 35 has two operative positions, in which the forked end portion 46 engages either the outer or inner surface of the wheel flange 36. A first operative position is illustrated in FIG. 1, wherein the end portion 46 approaches the outer surface of the flange and interferes with rotation of the wheel 34 by engaging the outwardly projecting abutment elements 38. A spring 48, extending between one end of the lever 35 and a pin 49 anchored on the deck plate 12, is provided for urging the lever 35 to the first operative position. For moving the lever to its second operative position, there is provided an electro-magnet 50, which is mounted on the bracket 41 and has a pole 51 positioned below the outer end of the lever. Accordingly, when the electromagnet 50 is energized, the lever 35 is pivoted clockwise, as viewed in FIG. 1, until the end portion 46 approaches the inner surface of the flange 36, in a position to interfere with the inwardly projecting abutment elements 37.

An advantageous circuit arrangement for operating the new step drive is illustrated in FIG. 4. In the illustrated arrangement, the motor 28 is connected to a voltage source 52 through a double-throw switch 53, by means of which the motor may be energized to rotate in either direction. Advantageously, when the step drive is in use, the motor 28 is energized continuously to rotate in one direction or the other. The electro-magnet 50 may be connected to a source 54 through a suitable pulse control 55 which functions, in effect, as a switch.

Using the circuit arrangement as described in the foregoing paragraph, initial energization of the motor 28 will cause the rotor of the motor to tend to rotate in one direction. However, assuming the electro-magnet 50 to be deenergized, rotation of the motor rotor is prevented by virtue of the interference between the escape lever 35 and one of the outwardly projecting abutment elements 38. When the pulse control 55 is triggered, to energize the electro-magnet, the lever 35 is pivoted clockwise, releasing the escape wheel 34 and permitting a partial rotation thereof until the end portion 46 of the release lever is engaged by an inwardly projecting abutment element 37. In the illustrated arrangement, such engagement would occur after ¼ revolution of the rotor and escape wheel, after which the motor would be held in a stalled condition. Upon subsequent de-energization of the electro-magnet 50, by action of the pulse control 55, the escape lever 35 is pivoted counterclockwise by the spring 48, releasing the escape wheel 34 for another quarter revolution, until the end portion 46 of the lever is engaged by the next successive outwardly projecting abutment element 38.

With the new apparatus, a series of stepped or intermittent driving movements of the motor 28 may be accomplished at extremely high speed, several thousand operations per minute being obtainable without difficulty. And, in this respect, it will be noted that two distinct operations of the drive mechanism are effected in each cycle of operation of the escape lever 35. In many cases, it may be perfectly satisfactory to operate the drive device without causing the motor 28 to remain in a stalled position between operations of the electro-magnet 50. A circuit for this purpose is indicated in FIG. 5, and, in the alternate circuit, the control switch 53 and source 52 are eliminated and the motor 28 and electro-magnet 50 are connected to the pulse control 55. Upon each operation of the pulse control to either energize or de-energize the electro-magnet 50, a measured pulse is directed to the motor 28, sufficient to cause it to rotate through the desired angle. Where desirable or expedient, the pulsing of the motor may occur only when the electro-magnet is energized, in which event the escape wheel 34 need be provided with only one set of abutment elements, projecting inward.

In either of the before-mentioned alternative circuit arrangements the direction of motor rotation may be readily reversed, so the operation of the step drive as a whole may take place in either direction. This is a substantial advantage over prior devices, and by reason thereof the new device may be used in a great many ways for which known devices are not suitable. By way of example only, the new step drive may be used in a master-slave system to transmit rotary motion with complete accuracy, in accordance with control pulses received. In this respect, it will be understood that the drive motor may be connected to the escape wheel through suitable gear drive means, to provide greater torque, where desired. A large variety of other uses is readily apparent, and it will be equally apparent that many of such uses do not permit of the use of known devices of this type.

It should be understood that the specific form of the invention herein illustrated and described, is intended to be representative only as certain changes may be made therein without departing from the clear teachings of the invention. Accordingly, reference should be made to the following appended claims in determining the full scope of the invention.

We claim:
1. An escapement mechanism comprising an escape wheel mounted for rotation, said escape wheel having alternate oppositely projecting abutment elements at spaced intervals about its periphery, said elements alternately projecting radially outwardly and inwardly from the periphery, an escape element having a portion positioned in straddling relation to said wheel and movable between two operative positions for alternatively engaging the oppositely projecting abutment elements, and selectively actuable solenoid means for moving said escape element alternately into said operative positions.

2. The escapement mechanism of claim 1, in which said escape wheel has an axially projecting circular flange about its periphery, said abutment elements project alternately radially inward and outward from said flange, and said lever is pivoted for movement of its end portion in a direction generally toward and away from the axis of said wheel.

3. A step drive mechanism comprising a shaft, means for rotating said shaft in clockwise and counterclockwise directions, an escapement wheel directly connected to said shaft, said escapement wheel having a plurality of stopping abutments projecting alternately outwardly and inwardly therefrom, an escapement element periodically engaging each of said abutments on said wheel to interrupt the rotation thereof when rotated in either direction, a spring means operatively associated with said escapement element to urge it into a first predetermined abutment engaging position, and a selectively actuated solenoid means to urge said escapement element into a second predetermined abutment engaging position whereby said escapement element is moved between the first and second abutment engaging positions by the cooperation of said spring and said solenoid, the output of said shaft thereby being stepped by the engagement of said escapement element with said escapement wheel.

4. A step drive mechanism according to claim 3 in which said means for rotating said shaft in clockwise and counterclockwise directions comprises a reversible electric motor.

5. A step drive mechanism according to claim 4 in which said reversible electric motor is constantly energized and said escapement wheel maintains said motor in a stalled condition when the rotation of said escapement wheel is interrupted by said escapement element.

6. A step drive mechanism according to claim 4 which includes energizing means for simultaneously selectively actuating said solenoid and said reversible electric motor.

7. A step drive mechanism according to claim 4 in which said escapement wheel is fixedly mounted for rotation with said motor output shaft, said stopping abutments comprise a plurality of symmetrical teeth radially projecting toward and away from the center of said escapement wheel, said escapement element has an end portion adapted in said first predetermined position to engage teeth projecting in a first direction and in said second predetermined position to engage teeth projecting in the opposite direction, and said escapement wheel is released for rotation when said escapement element travels between said first and second predetermined positions.

8. A step drive mechanism according to claim 7 in which said escapement wheel has an axially projecting circular flange, said radially projecting symmetrical teeth are circumferentially spaced thereon, and said escapement element has a portion straddling said flange and movable in a generally radial direction with respect thereto for alternative engagement with said outwardly and inwardly projecting symmetrical teeth.

9. A step drive mechanism according to claim 8 in which the straddling portion of said escapement element comprises means forming a recess for receiving said flange, and the width of said recess, measured in a direction radially of said wheel, is greater than the combined radial dimensions of the flange and an abutment element but less than the combined radial dimension of the flange and two alternate oppositely projecting abutment elements.

References Cited in the file of this patent

UNITED STATES PATENTS

| | | |
|---|---|---|
| 745,217 | Mensing | Nov. 24, 1903 |
| 1,273,734 | Chainat | July 23, 1918 |
| 1,514,751 | Wold | Nov. 11, 1924 |
| 1,557,944 | Reisboch | Oct. 20, 1925 |
| 1,972,971 | Barenyi | Sept. 11, 1934 |
| 2,209,858 | Steiert | July 30, 1940 |
| 2,531,882 | Johnson | Nov. 28, 1950 |
| 2,682,629 | Jordan | June 29, 1954 |
| 2,750,552 | Ryan | June 12, 1956 |
| 2,891,405 | Elmore | June 23, 1959 |
| 2,900,021 | Richtmyer et al. | Aug. 18, 1959 |
| 2,906,130 | Sheaffer | Sept. 29, 1959 |
| 2,913,905 | Clifford | Nov. 24, 1959 |

FOREIGN PATENTS

| | | |
|---|---|---|
| 87,912 | Austria | Apr. 10, 1922 |
| 221,749 | France | June 15, 1942 |